US012651079B1

(12) United States Patent
Choi et al.

(10) Patent No.: US 12,651,079 B1
(45) Date of Patent: Jun. 9, 2026

(54) METHOD OF ENHANCING CYBER RESILIENCE AND SYSTEM THEREOF

(71) Applicant: KOREA INTERNET & SECURITY AGENCY, Naju-si (KR)

(72) Inventors: Seul Ki Choi, Naju-si (KR); Joon Hyung Lim, Naju-si (KR); Dong Hwan Oh, Naju-si (KR); Tae Eun Kim, Naju-si (KR); Sae Woom Lee, Naju-si (KR); Tae Hyeon Kim, Naju-si (KR); Seo Yeon Kim, Naju-si (KR)

(73) Assignee: KOREA INTERNET & SECURITY AGENCY, Naju-si (KR)

( * ) Notice: Subject to any disclaimer, the term of this patent is extended or adjusted under 35 U.S.C. 154(b) by 0 days.

(21) Appl. No.: 19/460,586

(22) Filed: Jan. 27, 2026

(30) Foreign Application Priority Data

Nov. 12, 2025 (KR) ......................... 10-2025-0170139

(51) Int. Cl.
*G06F 21/57* (2013.01)
(52) U.S. Cl.
CPC .................................. *G06F 21/577* (2013.01)
(58) Field of Classification Search
CPC .. G06F 21/50; G06F 21/577; G06F 2221/034; G06F 2221/21; G06F 2221/2101
See application file for complete search history.

(56) References Cited

U.S. PATENT DOCUMENTS

| 10,764,298 B1 * | 9/2020 | Light ........................ | H04L 63/20 |
| 11,601,464 B2 * | 3/2023 | Viswanathan .......... | G06F 21/12 |

| 11,689,555 B2 * | 6/2023 | Cai .................... | G06Q 10/0635 |
| | | | 726/25 |
| 12,192,364 B1 * | 1/2025 | Mullaney .............. | H04L 9/3218 |
| 2016/0205126 A1 * | 7/2016 | Boyer ..................... | H04L 67/53 |
| | | | 726/25 |
| 2021/0133331 A1 * | 5/2021 | Lipkis ................. | H04L 63/1483 |

(Continued)

FOREIGN PATENT DOCUMENTS

| KR | 10-2015-0011802 A | 2/2015 |
| KR | 10-2019-0017209 A | 2/2019 |

(Continued)

OTHER PUBLICATIONS

An Office Action mailed by the Korean Ministry of Intellectual Property on Feb. 2, 2026, which corresponds to Korean Patent Application No. 10-2025-0170139 and is related to U.S. Appl. No. 19/460,586.

*Primary Examiner* — Kostas J Katsikis
(74) *Attorney, Agent, or Firm* — Studebaker Brackett PLLC

(57) ABSTRACT

A method and system of enhancing cyber resilience performed by a computing system is disclosed. According to one embodiment of the present disclosure, the method may comprise a step of acquiring vulnerability data of a target system based on resilience feature data including a quantitative assessment vector and a non-quantitative assessment text of the target system, a step of inputting input data including the vulnerability data into an artificial intelligence model and generating an enhancement strategy for the target system based on output of the artificial intelligence model and a step of controlling a security layer of the target system based on the enhancement strategy.

17 Claims, 9 Drawing Sheets

(56) References Cited

U.S. PATENT DOCUMENTS

| | | | | |
|---|---|---|---|---|
| 2023/0244794 A1* | 8/2023 | Vadala | .................. | G06F 21/577 |
| | | | | 726/25 |
| 2024/0430273 A1* | 12/2024 | Millar | ................ | H04L 63/1416 |

FOREIGN PATENT DOCUMENTS

| | | | | | |
|---|---|---|---|---|---|
| KR | 10-2676806 | B1 | 6/2024 | | |
| KR | 10-2025-0154899 | A | 10/2025 | | |
| WO | WO-2023064898 | A1 * | 4/2023 | ......... | H04L 63/1416 |
| WO | WO-2024211703 | A2 * | 10/2024 | ........... | H04L 9/3239 |
| WO | WO-2025019766 | A1 * | 1/2025 | ......... | H04L 63/1416 |

* cited by examiner

START

ACQUIRE RESILIENCE ASSESSMENT DATA OF TARGET SYSTEM — S100

CONVERT QUANTITATIVE DATA INTO
QUANTITATIVE ASSESSMENT VECTORS — S200

GENERATE NON-QUANTITATIVE ASSESSMENT TEXT — S300

PREPROCESS DATA — S400

ACQUIRE VULNERABILITY DATA — S500

GENERATE ENHANCEMENT STRATEGY FOR TARGET SYSTEM — S600

CONTROL SECURITY LAYER OF TARGET SYSTEM — S700

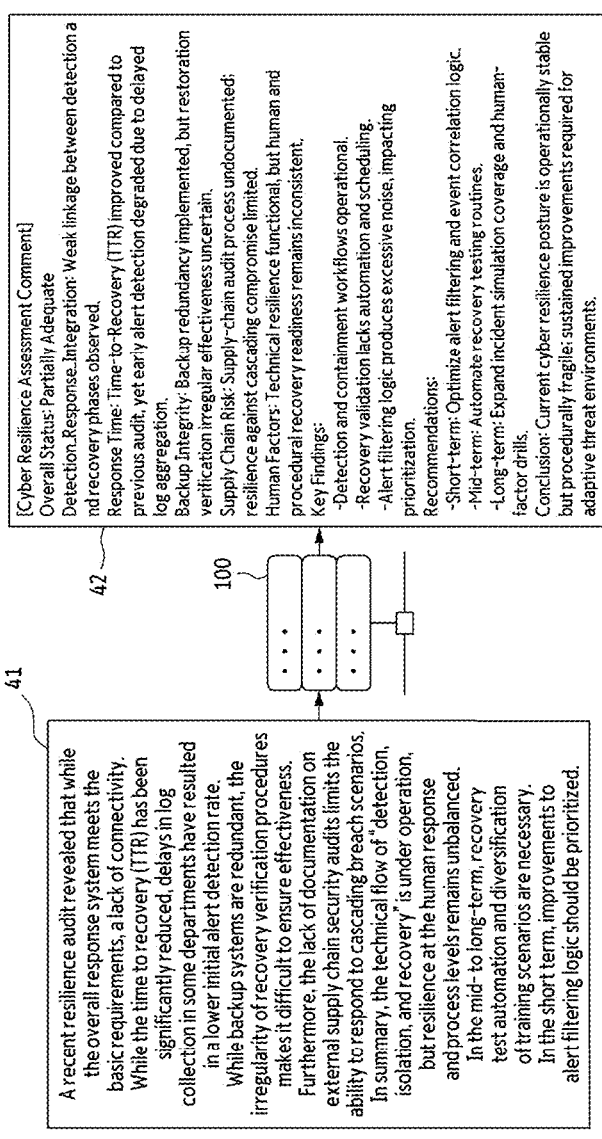

41

A recent resilience audit revealed that while the overall response system meets the basic requirements, a lack of connectivity. While the time to recovery (TTR) has been significantly reduced, delays in log collection in some departments have resulted in a lower initial alert detection rate. While backup systems are redundant, the irregularity of recovery verification procedures makes it difficult to ensure effectiveness. Furthermore, the lack of documentation on external supply chain security audits limits the ability to respond to cascading breach scenarios. In summary, the technical flow of "detection, isolation, and recovery" is under operation, but resilience at the human response and process levels remains unbalanced. In the mid- to long-term, recovery test automation and diversification of training scenarios are necessary. In the short term, improvements to alert filtering logic should be prioritized.

42

100

[Cyber Resilience Assessment Comment]
Overall Status: Partially Adequate
Detection_Response_Integration: Weak linkage between detection and recovery phases observed.
Response Time: Time-to-Recovery (TTR) improved compared to previous audit, yet early alert detection degraded due to delayed log aggregation.
Backup Integrity: Backup redundancy implemented, but restoration verification irregular; effectiveness uncertain.
Supply Chain Risk: Supply-chain audit process undocumented; resilience against cascading compromise limited.
Human Factors: Technical resilience functional, but human and procedural recovery readiness remains inconsistent.
Key Findings:
- Detection and containment workflows operational.
- Recovery validation lacks automation and scheduling.
- Alert filtering logic produces excessive noise, impacting prioritization.
Recommendations:
- Short-term: Optimize alert filtering and event correlation logic.
- Mid-term: Automate recovery testing routines.
- Long-term: Expand incident simulation coverage and human-factor drills.
Conclusion: Current cyber resilience posture is operationally stable but procedurally fragile; sustained improvements required for adaptive threat environments.
[End_of Comment]

FIG. 5

| # | FIELD NAME | TYPE | REQUIRED | DESCRIPTION | EXAMPLE |
|---|---|---|---|---|---|
| 1 | id | UUID | Y | RECORD UNIQUE IDENTIFIER | vpra-111e-.. |
| 2 | vp_id | UUID | Y | ASSOCIATED VULNERABILITY POINT IDENTIFIER | vp-0001 |
| 3 | asset_id | TEXT | Y | ASSET UNIQUE KEY | db-account |
| 4 | asset_type | TEXT | Y | server/database/application/ cloud account/network/other | database |
| 5 | asset_name | TEXT | N | HUMAN-READABLE ASSET NAME | Account DB |
| 6 | criticality | TEXT | N | BUSINESS IMPACT-BASED CRITICALITY Critical/High/Medium/Low | Critical |
| 7 | dependencies | TEXT | N | LIST OF OTHER ASSETS ON WHICH THE ASSET DEPENDS AND RELATIONSHIPS THERE BETWEEN | [{"asset id": "svc-auth", "relation": "depend_on"}] |

| # | FIELD NAME | TYPE | REQUIRED | DESCRIPTION | EXAMPLE |
|---|---|---|---|---|---|
| 1 | strategy_id | UUID | Y | ENHANCEMENT STRATEGY UNIQUE ID | strat-1001 |
| 2 | vp_id | UUID | N | REFERENCES WHICH VULNERABILITY POINT OR GROUP OF VULNERABILITY POINTS THIS STRATEGY ADDRESSES | vp-0001 |
| 3 | title | TEXT | Y | ENHANCEMENT STRATEGY NAME | INTRODUCTION OF AUTOMATED BACKUP VERIFICATION PROCESSES |
| 4 | description | TEXT | Y | DETAILED DESCRIPTION AND PURPOSE OF THE STRATEGY | ESTABLISHMENT OF POLICIES, DEPLOYMENT OF AUTOMATED SCRIPTS, AND IMPLEMENTATION OF REGULAR TESTING |
| 5 | priority | TEXT | N | USE HIGH, MEDIUM, LOW, OR INTEGER TYPE PRIORITY | High |
| 6 | phases | JSON | Y | LIST OF PHASED EXECUTION PLANS | [{"phase name": "policy", "start offset days":0, "duration days":14, "steps":"Policy drafting" "definition of validation criteria |
| 7 | dependencies | JSON | N | LIST OF PREREQUISITE OR COMPATIBLE STRATEGY IDS | ["strat-0901"] |
| 8 | confidence | NUMERIC | N | STRATEGY RECOMMENDATION CONFIDENCE (0-1) | 0.82 |

FIG. 7

| # | FIELD NAME | TYPE | REQUIRED | DESCRIPTION | EXAMPLE |
|---|---|---|---|---|---|
| 1 | template_id | UUID | Y | TEMPLATE UNIQUE IDENTIFIER | art-3001-9b6f |
| 2 | strategy_id | UUID | N | ASSOCIATED ENHANCEMENT STRATEGY ID | strat-1001-... |
| 3 | name | TEXT | Y | TEMPLATE NAME | SSH DAEMON HARDENING |
| 4 | template_type | TEXT | Y | firewall rule/os config/app_config/ script ETC. | os config |
| 5 | target_platform | TEXT | Y | linux/windows/network device/ container/other | linux |
| 6 | template_format | TEXT | Y | text/yaml/json/script ETC. | text |
| 7 | preconditions | JSON | N | LIST OF CHECKPOINTS BEFORE APPLYING ENHANCEMENT ACTIONS (SECURING CONSOLE ACCESS, PERFORMING BACKUPS, ETC.) | ["console access verified", "ssh key deployed"] |
| 8 | post_checks | JSON | N | VERIFICATION PROCEDURES TO PERFORM AFTER APPLYING ENHANCEMENT ACTIONS | ["sshd service restart"] |
| 9 | rollback_instrucsions | JSON | N | FIREWALL PROCEDURES BEFORE APPLYING ENHANCEMENT ACTIONS | [cp/etc/ssh/sshd_config.back/etc/ ssh/sshd_config; ....] |
| 10 | impact_estimate | TEXT | N | EXPECTED IMPACT ON SERVICE | SSH ACCESS RESTRICTIONS POSSIBLE (CONSOLE ACCESS REQUIRED) |

FIG. 8

METHOD OF ENHANCING CYBER RESILIENCE AND SYSTEM THEREOF

CROSS-REFERENCE TO RELATED APPLICATION

This application claims priority from Korean Patent Application No. 10-2025-0170139 filed on Nov. 12, 2025 in the Korean Intellectual Property Office, and all the benefits accruing therefrom under 35 U.S.C. 119, the contents of which in its entirety are herein incorporated by reference.

TECHNICAL FIELD

A method of enhancing cyber resilience and a system to which the method is applied are disclosed. More specifically, the present disclosure relates to a method of enhancing cyber resilience of a specific system and a system to which the method is applied.

DESCRIPTION OF THE RELATED ART

Despite the rapidly increasing importance of cyber resilience at both the national and industrial levels, the technological foundation for systematically assessing cyber resilience quantitatively and qualitatively and developing practical enhancement strategies based on the assessment results remains insufficient. Most organizations and companies conduct periodic security assessments to examine the safety of their assets, but these assessments are largely perfunctory and suffer from structural limitations that prevent them from leading to actual improvements in resilience. In other words, security assessment results are present merely in the form of reports, failing to provide practical actionable measures for enhancing resilience.

Currently, organizations conducting security tests of ICT systems and subjected to assessment rely on periodic security assessment reports to examine security levels. However, these reports are largely perfunctory and suffer from structural limitations that prevent them from providing concrete actionable strategies for improving resilience levels.

Therefore, an intelligent technology system capable of developing enhancement strategies based on cyber resilience assessment results is required.

Problems to be Solved

A technical problem to be solved through some embodiments of the present disclosure is to provide a method of providing a cyber resilience enhancement scheme based on the results of a cyber resilience assessment of a specific system.

Another technical problem to be solved through some embodiments of the present disclosure is to provide a customized plan for enhancing cyber resilience using any one of a specific system's incident report, crisis response records, and agency information.

Still another technical problem to be solved through some embodiments of the present disclosure is to provide a method of generating an executable cyber resilience enhancement strategy using an artificial intelligence model.

The technical problems of the present disclosure are not limited to the above-mentioned technical problems, and other technical problems that are not mentioned will be clearly understood by those skilled in the art from the description below.

A method of enhancing cyber resilience according to one embodiment of the present disclosure for solving the above-described technical problem.

Means for Solving the Problems

According to some embodiments of the present disclosure, a method of enhancing cyber resilience performed by a computing system is provided. The method may comprise a step of acquiring vulnerability data of a target system based on resilience feature data including a quantitative assessment vector and a non-quantitative assessment text of the target system, a step of inputting input data including the vulnerability data into an artificial intelligence model and generating an enhancement strategy for the target system based on output of the artificial intelligence model and a step of controlling a security layer of the target system based on the enhancement strategy.

In some embodiments, the method may further comprise prior to the step of acquiring vulnerability data of the target system, a step of acquiring resilience assessment data of the target system, a step of converting quantitative data included in the resilience assessment data into the quantitative assessment vector and a step of refining the non-quantitative assessment data included in the resilience assessment data to generate the non-quantitative assessment text. The resilience assessment data may include non-quantitative assessment data of the target system.

In some embodiments, the vulnerability data may include at least one of vulnerability information of the target system, a risk score due to the vulnerability, information on impact scope of the vulnerability, and information on evidence for deriving the vulnerability.

In some embodiments, the enhancement strategy may include a resilience enhancement template, and the resilience enhancement template is a resilience enhancement template corresponding to a vulnerability of the target system among a plurality of predefined resilience enhancement templates.

In some embodiments, the enhancement strategy may further include at least one of a plurality of enhancement strategy candidates, an impact of the enhancement strategy, an assessment indicator for each of the enhancement strategy candidates, and an enhancement strategy priority.

In some embodiments, the step of generating an enhancement strategy for the target system may include a step of selecting a specific enhancement strategy based on an assessment indicator for each of the enhancement strategy candidates.

In some embodiments, the enhancement strategy may include a plurality of strategy phases whose order is predefined, and the step of controlling the security layer of the target system based on the enhancement strategy may include a step of controlling the security layer of the target system based on the order of the strategy phases.

In some embodiments, the input data may include the vulnerability data and context data, and the context data may include at least one of version of the resilience assessment data, assessment performer, and assessment item information.

In some embodiments, the method may further comprise a step of generating evidence-item data by mapping each assessment item and each pieces of assessment evidence included in the resilience assessment data and a step of generating asset linkage information by mapping each asset of the target system and each detailed data of the resilience assessment data based on the evidence-item data.

In some embodiments, the step of acquiring vulnerability data of the target system may include a step of acquiring a cache enhancement scheme corresponding to the vulnerability data, and the cache enhancement scheme is a list of security configuration change items for addressing vulnerabilities in the target system without causing service interruption.

According to another embodiments of the present disclosure, a cyber resilience enhancement system is provided. The system may comprise one or more processors and a memory storing a computer program executed by the one or more processors. The computer program may include instructions that cause the processor to perform: a step of acquiring vulnerability data of a target system based on resilience feature data including a quantitative assessment vector and a non-quantitative assessment text of the target system, a step of inputting input data including the vulnerability data into an artificial intelligence model and generating an enhancement strategy for the target system based on output of the artificial intelligence model and a step of controlling a security layer of the target system based on the enhancement strategy.

In some embodiments, the computer program may further include instructions for causing the processor to perform: a step of generating evidence-item data by mapping each assessment item and each pieces of assessment evidence included in the resilience assessment data and a step of generating asset linkage information by mapping each asset of the target system and each detailed data of the resilience assessment data based on the evidence-item data.

According to other embodiments of the present disclosure, a computer-readable recording medium storing instructions is provided. The instructions may configured to perform: a step of acquiring vulnerability data of a target system based on resilience feature data including a quantitative assessment vector and a non-quantitative assessment text of the target system, a step of inputting input data including the vulnerability data into an artificial intelligence model and generating an enhancement strategy for the target system based on output of the artificial intelligence model and a step of controlling a security layer of the target system based on the enhancement strategy.

BRIEF DESCRIPTION OF THE DRAWINGS

FIG. 4 shows a diagram illustrating a method of generating non-quantitative assessment text that may be performed in some embodiments of the present disclosure.

FIG. 5 shows a diagram illustrating a schema of vulnerable data according to some embodiments of the present disclosure.

FIG. 7 shows a diagram illustrating a portion of a schema of enhancement strategy data according to some embodiments of the present disclosure.

FIG. 8 shows a diagram illustrating a portion of a schema of enhancement strategy data according to some embodiments of the present disclosure.

DETAILED DESCRIPTION OF THE EMBODIMENTS

Figure 1:
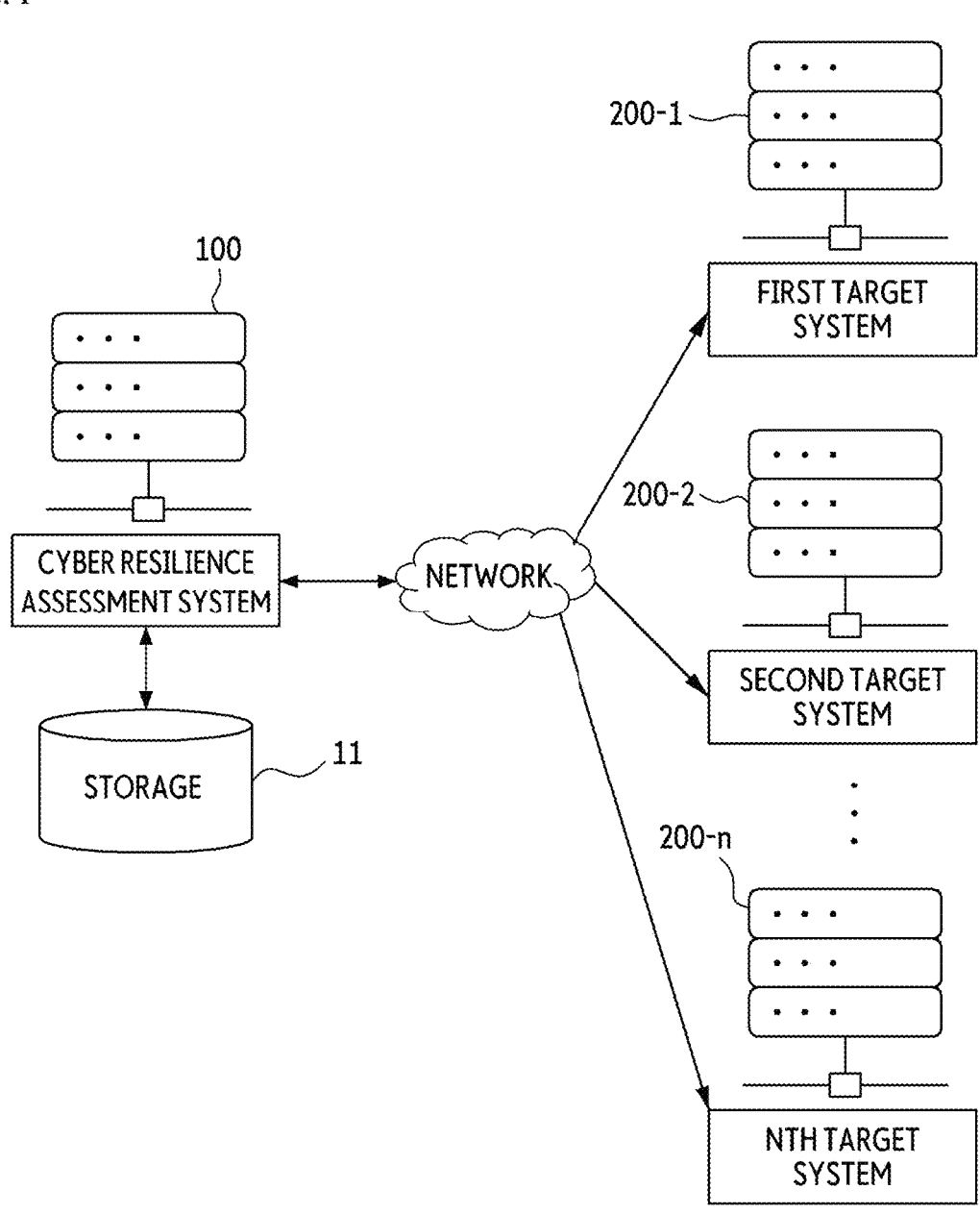
FIG. 1 shows a diagram illustrating an environment in which a cyber resilience enhancement system according to one embodiment of the present disclosure may be applied.

Hereinafter, preferred embodiments of the present disclosure will be described in detail with reference to the accompanying drawings. The advantages and features of the present invention and the methods for achieving them will be apparent from the embodiments described in detail below with reference to the accompanying drawings. However, the technical spirit of the present invention is not limited to the embodiments below and may be implemented in various different forms. The embodiments below are provided to complete the description of the technical spirit of the present invention and to fully convey the scope of the present invention to a person of ordinary skill in the art to which the present invention pertains, and the technical spirit of the present invention is defined only by the scope of the claims.

In describing the present disclosure, detailed descriptions of known related configurations or functions may be omitted when it is determined that such detailed descriptions may obscure the gist of the present invention. Unless otherwise defined, terms (including technical and scientific terms) used in the embodiments below may be used in meanings commonly understood by those skilled in the art to which the present disclosure pertains; however, they may vary according to the intent of an engineer engaged in the relevant field, court precedents, or the emergence of new technologies. The terms used in the present disclosure are for describing the embodiments and are not intended to limit the scope of the present disclosure.

Expressions in the singular used in the embodiments below include plural concepts unless clearly and specifically indicated as singular in context. Likewise, plural expressions include singular concepts unless clearly and specifically indicated as plural in context. Further, terms such as first, second, A, B, (a), and (b) used in the embodiments below are only for distinguishing one component from another component, and the terms do not limit the nature, order, or sequence of the components.

Hereinafter, definitions of terms that may appear in some embodiments of the present disclosure will be described.

The term "quantitative assessment data" according to some embodiments of the present disclosure may refer to a set of measured values for each numerically expressible assessment item when assessing cyber resilience of a target system. For example, quantitative assessment data for a target system may include the average recovery time, failure frequency, and availability rate of the target system.

The term "non-quantitative assessment data" according to some embodiments of the present disclosure refers to data that includes qualitative assessment results derived through the assessor's expert judgment and descriptive responses regarding items that may not be expressed numerically when assessing the cyber resilience of a target system.

In some embodiments of the present disclosure, the resilience assessment data of the target system may be understood as data including quantitative assessment data and non-quantitative assessment data of the target system.

The term "vulnerability data" according to some embodiments of the present disclosure may include basic information regarding vulnerabilities of the target system, asset information of the target system related to the vulnerabilities, and impact information on each target system asset affected by the vulnerabilities. Furthermore, the vulnerability data may include vulnerability evidence information regarding which assessment items of the cyber resilience assessment results of the target system have been used to identify vulnerabilities in the target system.

In some embodiments of the present disclosure, the vulnerability data may further include framework mapping information, which is information on relevant tactics, techniques, and procedures (TTPs) within the MITRE ATT&CK framework related to vulnerabilities.

The term "resilience enhancement template" according to some embodiments of the present disclosure may be understood as configuration data that structure enhancement measures, prerequisites, and rollback procedures applicable to a specific target system, output from an artificial intelligence model.

For example, the term "resilience enhancement template" may be understood as a resilience enhancement measure that may be directly applied to a target system output from an artificial intelligence model. A resilience enhancement template may include a template unique identifier, a linkage strategy identifier associated with the template, a template name, template type information, application target platform information, a template format, template application requirements information, a post-template application verification procedure, rollback instruction information, and information on the impact of the template on a service.

In some embodiments of the present disclosure, the template type information may be any one of a firewall rule change type, an operating system configuration change type, an application configuration change type, and a script type.

In some embodiments of the present disclosure, the linkage strategy identifier may refer to data corresponding to a unique identifier or name of a strategy referenced or linked to a specific resilience enhancement template among previously stored resilience enhancement strategies associated with the specific resilience enhancement template.

In some embodiments of the present disclosure, the application target platform information may indicate which platforms a specific resilience enhancement template is applicable to. For example, the application target platform information may be any one of Linux, Windows, network services, and containers.

In the following embodiments, an enhancement strategy may include, as data defining a phased execution plan for specific actions to be taken to improve resilience, a plurality of sub-strategy phases, objectives, priorities for each sub-strategy phase, and associated vulnerabilities included in the enhancement strategy.

For example, a first enhancement strategy may include an identifier of the first enhancement strategy, vulnerability information related to the first enhancement strategy, the name of the first enhancement strategy, purpose of the first enhancement strategy, detailed strategy phases included in the first enhancement strategy, priority information for each detailed strategy phase, prerequisite information for the first enhancement strategy, identifiers of strategies compatible with the first enhancement strategy, and reliability information for the first enhancement strategy.

Here, the reliability information for the first enhancement strategy may be a numerical value representing the probabilistic expected value of the first enhancement strategy successfully mitigating vulnerabilities or an impact score based on vulnerability data from the target system input to an artificial intelligence model.

In addition, the prerequisite information for the first enhancement strategy may refer to unique identifiers of other enhancement strategies that must be executed or satisfied in advance in order to execute the first enhancement strategy.

Hereinafter, some embodiments of the present disclosure will be described with reference to the drawings.

FIG. 1 shows a diagram illustrating an environment in which a cyber resilience enhancement system according to one embodiment of the present disclosure may be applied.

Each component illustrated in FIG. 1 may represent software or hardware, such as a field programmable gate array (FPGA) or an application-specific integrated circuit (ASIC). However, the components are not limited to software or hardware; they may be configured to be present on addressable storage media or be configured to execute one or more processors. The functions provided within the components may be implemented by more detailed components, or a plurality of components may be combined to form a single component that performs a specific function.

In some embodiments, the cyber resilience enhancement system 100 illustrated in FIG. 1 may communicate with other components via a network. The network may be implemented as any type of wired or wireless network, such as a local area network (LAN), a wide area network (WAN), a mobile radio communication network, or wireless broadband internet (Wibro).

In some embodiments, the plurality of target systems 200-1, 200-2, and 200-n illustrated in FIG. 1 may include a web server, a database server, a file server, an application server, a mail server, a domain name system (DNS) server, a virtualization server, and a cloud server.

In some embodiments, a storage 11 of the cyber resilience enhancement system 100 may store vulnerability data, quantitative assessment data, and non-quantitative assessment data of a plurality of target systems 200-1, 200-2, and 200-n. The storage 11 may also be a storage for storing a plurality of resilience enhancement templates, a plurality of enhancement strategies, scripts included in each enhancement strategy, and MITRE ATT&CK framework technique information.

In some embodiments, the cyber resilience enhancement system 100 may be understood as a system that monitors the operational status of each of a plurality of target systems 200-1, 200-2, and 200-n in real time, evaluates the level of resilience, and derives an enhancement strategy based on the assessment results.

Figure 2:
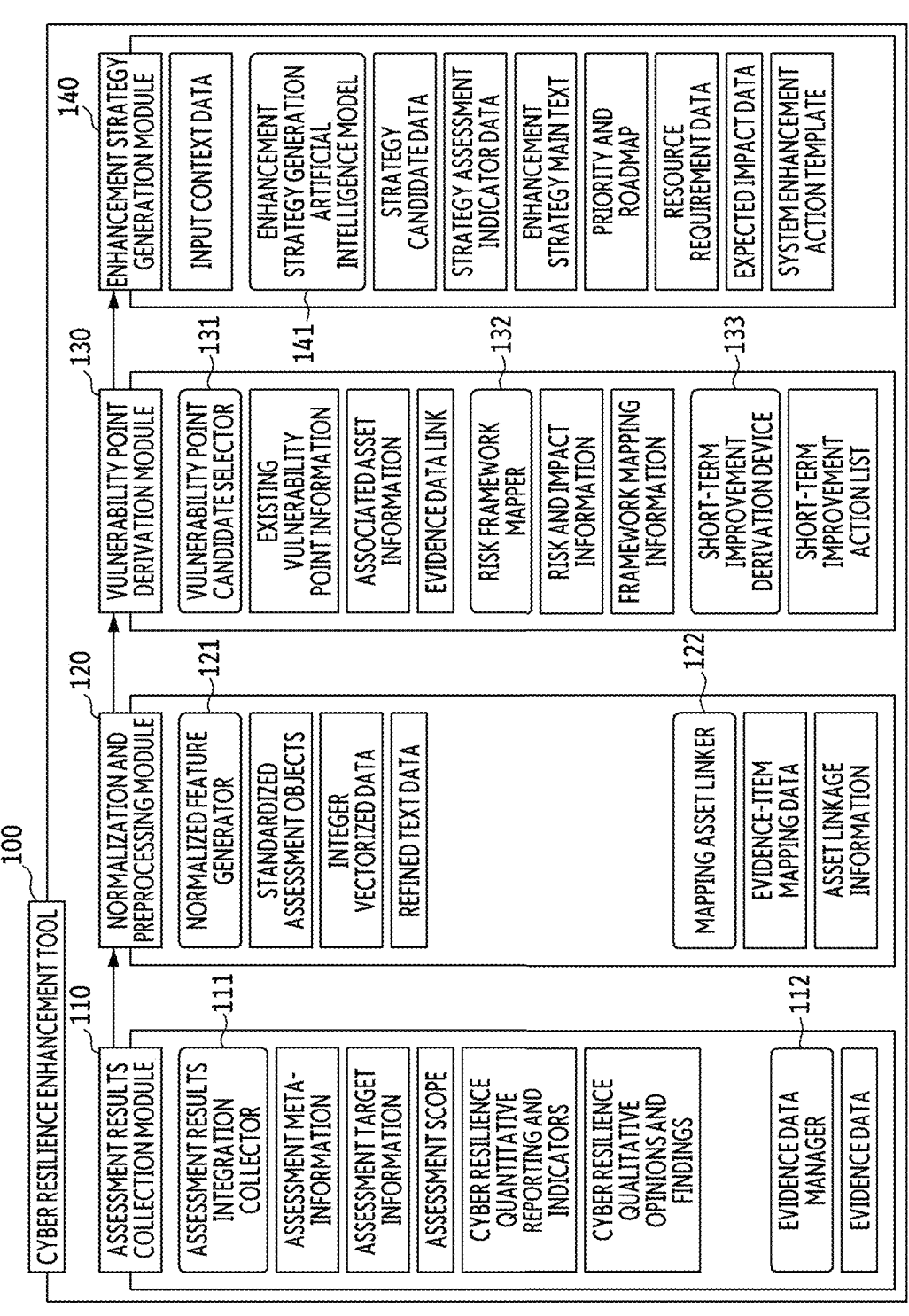
FIG. 2 shows a block diagram illustrating the configuration of a cyber resilience enhancement system according to one embodiment of the present disclosure.

Hereinafter, operations that each component illustrated in FIG. 1 may perform will be described with reference to FIGS. 1 and 2.

According to one embodiment of the present disclosure, the assessment results collection module 110 of the cyber resilience enhancement system 100 may be a module that receives cyber resilience assessment data of a first target system 200-1.

In some embodiments of the present disclosure, the assessment results collection module 110 may be a module that receives data regarding past incident reports or crisis response records of the first target system 200-1.

In some embodiments of the present disclosure, an assessment results integration collector 111 of the assessment results collection module 110 may be a module that collects and stores assessment metadata, target system information, assessment scope information, quantitative assessment data, and non-quantitative assessment data of a plurality of target systems 200-1, 200-2, and 200-n.

In some embodiments of the present disclosure, assessment metadata may be metadata including the identifier, performance date, assessment version, assessment performer, and assessment method of cyber resilience assessment data for a specific target system.

In some embodiments of the present disclosure, target system information may include information including the size type, industry type, and list of services of the organization corresponding to the target system.

In some embodiments of the present disclosure, the assessment scope defines the scope of assets within the target system for which a cyber resilience assessment is performed, and may include information for identifying components subject to assessment, such as servers, network equipment, terminals, control facilities, application software, and data storage devices.

In some embodiments of the present disclosure, the evidence data manager 112 of the assessment results collection module 110 may be a module that collects and stores evidence data related to cyber resilience assessment data for a specific target system. For example, the evidence data may include original reports, screenshots (e.g., system settings screens, security alert windows), log snapshots (e.g., system event logs, authentication logs, access logs, and security agent logs), configuration files (e.g., files containing security configurations for operating systems, servers, network equipment, and applications), and scan results (e.g., automated scan results performed by vulnerability scanners, configuration diagnostic tools, and security scan scripts) used to assess the cyber resilience of a specific target system.

According to another embodiment of the present disclosure, a normalization and preprocessing module 120 of the cyber resilience enhancement system 100 may be a module that preprocesses cyber resilience assessment data of a plurality of target systems 200-1, 200-2, and 200-*n* acquired by the assessment results collection module 110.

In some embodiments of the present disclosure, a normalization and feature generator 121 of the normalization and preprocessing module 120 may be a module that converts cyber resilience assessment data into a common schema and preprocesses it into a specific data structure.

In some embodiments of the present disclosure, the normalization and feature generator 121 may be a module that converts quantitative assessment data included in cyber resilience assessment data of a specific target system into vectors.

In some embodiments of the present disclosure, the normalization and feature generator 121 may be a module that converts non-quantitative assessment data included in cyber resilience assessment data of a specific target system into refined text. Here, the description of the text refining method will be omitted and replaced by reference to prior art.

In some embodiments of the present disclosure, a mapping and asset linker 122 of the normalization and preprocessing module 120 may be a module that maps each assessment item and each piece of assessment evidence included in the resilience assessment data to generate evidence-item data. The assessment items and assessment evidence included in the resilience assessment data may be clearly understood by referring to the above-described embodiments.

In some embodiments of the present disclosure, the mapping and asset linker 122 may be a module that generates asset linkage information that maps each assessment item included in the resilience assessment data of the first target system 200-1 to each asset of the first target system 200-1.

According to another embodiment of the present disclosure, a vulnerability point derivation module 130 may be a module that generates vulnerability data for the first target system 200-1 based on resilience feature data obtained by preprocessing the resilience assessment data of the first target system 200-1.

In some embodiments of the present disclosure, the vulnerability point candidate selector 131 may generate vulnerability point basic information, associated asset information, and vulnerability point connection information for the first target system 200-1 based on the resilience feature data of the first target system 200-1.

Here, the vulnerability point basic information may be understood as a structured data set for describing vulnerable components among the components of the first target system 200-1, and the vulnerable properties or operations of the components. In addition, the associated asset information may refer to information about the assets of the first target system 200-1 corresponding to the vulnerability point basic information. In addition, the vulnerability point connection information may be information related to an assessment item in the resilience assessment data related to the evidence for deriving vulnerabilities of the first target system 200-1.

According to another embodiment of the present disclosure, a risk and framework mapper 132 may be a module that assesses the risk and impact of derived vulnerabilities and generates associations between the derived vulnerabilities and the techniques within the MITRE ATT&CK framework.

In some embodiments of the present disclosure, the risk and framework mapper 132 may calculate a risk score for vulnerabilities in the first target system 200-1 derived by the vulnerability point candidate selector 131.

In some embodiments of the present disclosure, the risk and framework mapper 132 may output asset information, service information, and user scope information of the first target system 200-1 affected by vulnerabilities derived by the vulnerability point candidate selector 131.

In some embodiments of the present disclosure, the risk and framework mapper 132 may output technique information of the MITRE ATT&CK framework related to vulnerabilities of the first target system 200-1 derived by the vulnerability point candidate selector 131. The description of the MITRE ATT&CK framework will be omitted and replaced by reference to prior art.

According to another embodiment of the present disclosure, a short-term improvement derivation device 133 may output a cache enhancement scheme for addressing vulnerabilities of the first target system 200-1 derived by the vulnerability point candidate selector 131.

In some embodiments of the present disclosure, the storage 11 may include a plurality of cache enhancement schemes, and the short-term improvement derivation device 133 may select and output a cache enhancement scheme corresponding to the first target system 200-1 based on vulnerability data of the first target system 200-1.

In some embodiments of the present disclosure, the cache enhancement scheme may refer to a list of security configuration change items for addressing vulnerabilities in the target system without causing service interruption.

In other embodiments of the present disclosure, the cache enhancement scheme may be a resilience enhancement scheme with five or fewer security configuration change items.

In other embodiments of the present disclosure, the cache enhancement scheme may be a resilience enhancement scheme that does not involve source code modifications or hardware replacement.

According to another embodiment of the present disclosure, an enhancement strategy generation module 140 may be a module that inputs vulnerability data of the first target system 200-1 output by the vulnerability point derivation module 130 into an enhancement strategy generation artificial intelligence model 141, and generates an enhancement strategy corresponding to the first target system 200-1 based on the output of the enhancement strategy generation artificial intelligence model 141.

In some embodiments of the present disclosure, the enhancement strategy generation module 140 may input input data including vulnerability data and context data of the first target system 200-1 into the enhancement strategy generation artificial intelligence model 141, and obtain an enhancement strategy of the first target system 200-1 from the enhancement strategy generation artificial intelligence model 141.

In some embodiments of the present disclosure, the enhancement strategy generation artificial intelligence model 141 may, in response to receiving input data, output one or more of a plurality of enhancement strategy candidates, assessment indicators of each of the plurality of enhancement strategy candidates, strategy phase configuration information of each of the plurality of enhancement strategy candidates, priority information of each of the strategy phases of each of the plurality of enhancement strategy candidates, resource requirement information of each of the plurality of enhancement strategy candidates, expected impact information of each of the plurality of enhancement strategy candidates, and a resilience enhancement template associated with the first target system 200-1.

So far, the configuration and operation of the cyber resilience enhancement system 100, as well as exemplary environments to which the cyber resilience enhancement system 100 may be applied, have been described with reference to FIGS. 1 and 2.

Next, a method of enhancing cyber resilience according to another embodiment of the present disclosure will be described with reference to FIGS. 3 to 8. The method of enhancing cyber resilience according to this embodiment may be performed by one or more computing systems. In addition, in the method of enhancing cyber resilience according to this embodiment, some operations may be performed by a first computing device, while the remaining operations may be performed by a second computing device. For example, some operations of the method of enhancing cyber resilience according to this embodiment may be performed by an on-premise physical server, while the remaining operations may be performed by a cloud compute instance. Furthermore, for example, some operations of the method of enhancing cyber resilience according to this embodiment may be performed by a cyber resilience enhancement system, while the remaining operations may be performed by a target system. Hereinafter, when the performer of each action is omitted, it may be understood that the performer is the cyber resilience enhancement system.

Figure 3:
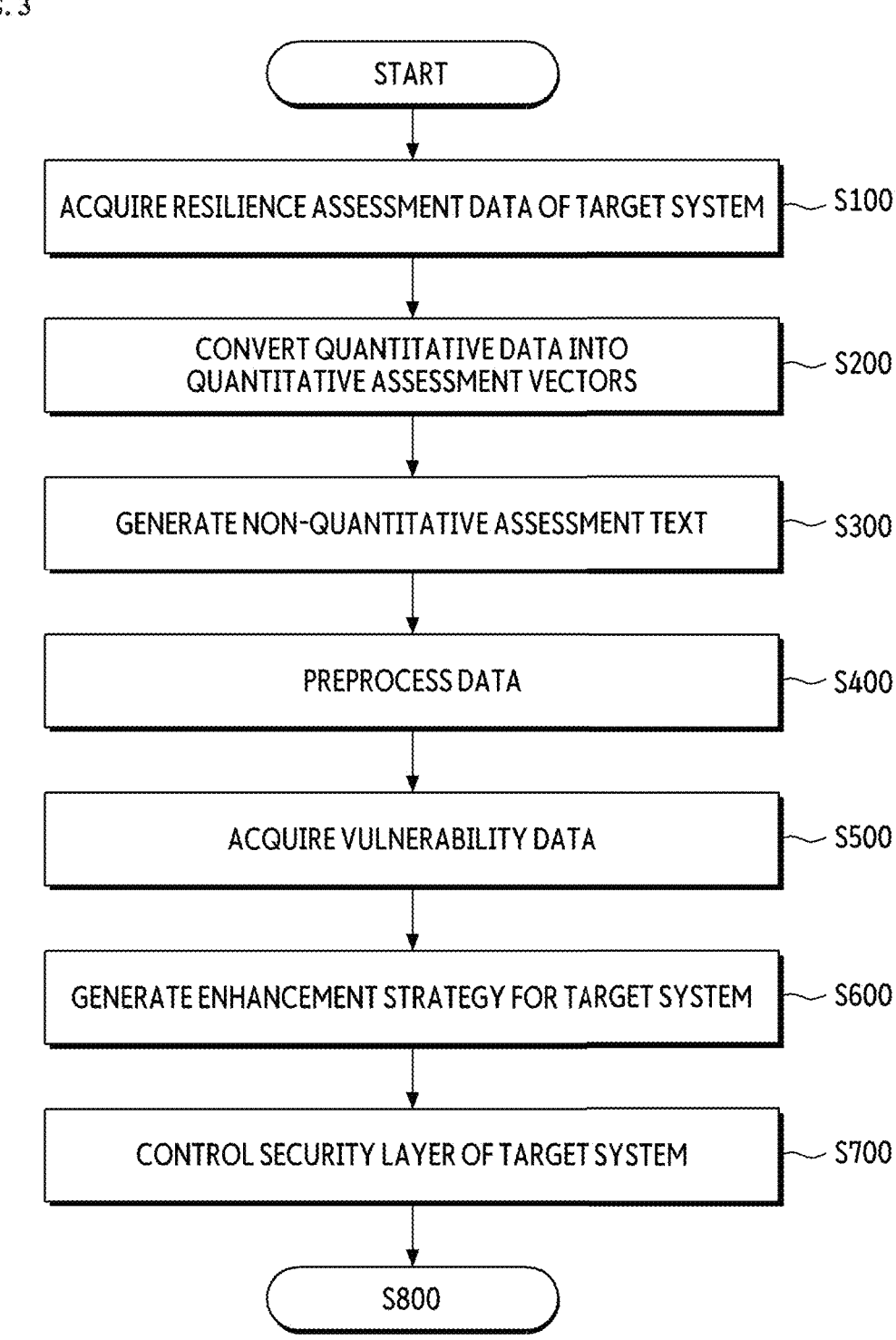
FIG. 3 shows a flowchart illustrating a method of enhancing cyber resilience according to another embodiment of the present disclosure.

In Step S100 illustrated in FIG. 3, the cyber resilience enhancement system 100 may acquire resilience assessment data of the first target system 200-1.

In some embodiments related to Step S100, the resilience assessment data may refer to a report including previously performed cyber resilience assessment results for the first target system 200-1. Furthermore, the report may include quantitative assessment data and non-quantitative assessment data for the first target system 200-1.

In other embodiments related to Step S100, the resilience assessment data may include a past incidence report and a crisis response report for the first target system 200-1. In other words, the cyber resilience enhancement system 100 according to some embodiments of the present disclosure may receive a report including cyber resilience assessment results. However, when no report is available, the system may be understood to operate to construct cyber resilience assessment data based on the past incidence report and crisis response report of the first target system 200-1.

In Step S200, the cyber resilience enhancement system 100 may convert the quantitative assessment data of the cyber resilience assessment data input in Step S100 into a quantitative assessment vector. The description of the method for converting specific metrics into vectors will be omitted and replaced by reference to prior art.

In Step S300, the cyber resilience enhancement system 100 may refine the non-quantitative assessment data of the cyber resilience assessment data input in Step S100 to generate non-quantitative assessment text.

For example, referring to FIG. 4, the cyber resilience enhancement system 100 may convert a qualitative assessment comment 41 included in the resilience assessment data of the first target system 200-1 into non-quantitative assessment text 42. As illustrated in FIG. 4, the non-quantitative assessment text 42 may be generated by mapping values obtained by analyzing the qualitative assessment comment 41 to each pre-defined key.

In Step S400, the cyber resilience enhancement system 100 may preprocess the cyber resilience assessment data received from the first target system 200-1 based on the operations of Steps S200 and S300 to generate resilience feature data.

In some embodiments related to Step S400, the resilience feature data may be data having a pre-defined schema format.

In some other embodiments related to Step S400, the resilience feature data may include quantitative assessment vectors, non-quantitative assessment text, evidence-item data, and asset linkage information.

In Step S500, the cyber resilience enhancement system 100 may acquire vulnerability data of the first target system 200-1 based on the resilience feature data acquired in Step S400.

In some embodiments related to Step S500, the vulnerability data of the first target system 200-1 may include vulnerability point basic information. Vulnerability point basic information may be understood as structured data set for describing vulnerable components among the components of the first target system 200-1, and the vulnerable properties or operations of the components.

In some other embodiments related to Step S500, the vulnerability data of the first target system 200-1 may include associated asset information. Associated asset information will be described in detail with reference to FIG. 5.

For example, FIG. 5 may be understood as a diagram illustrating a schema of associated asset information included in vulnerability data. Referring to FIG. 5, the associated asset information may include a record unique identifier, which is an identifier of the associated asset information schema, a vulnerability identifier associated with the associated asset information, a unique key of an asset associated with the associated asset information schema, type information of the asset associated with the associated asset information schema, a name of the asset associated with the associated asset information schema, an impact type of a vulnerability associated with the associated asset information schema, and information about an asset that has a dependency on the asset associated with the associated asset information schema.

In some embodiments of the present disclosure, the vulnerability identifier may be an identifier that identifies a vulnerability corresponding to the first target system 200-1 among a plurality of vulnerabilities stored in the storage 11 of the cyber resilience enhancement system 100.

In some other embodiments related to Step S500, the vulnerability data of the first target system 200-1 may include a cache enhancement scheme applicable to the first target system 200-1.

In Step S600, the cyber resilience enhancement system 100 may input input data including vulnerability data of the first target system 200-1 acquired in Step S500 into an artificial intelligence model, and generate an enhancement strategy corresponding to the first target system 200-1 based on the output of the artificial intelligence model.

In some embodiments related to Step S600, the enhancement strategy corresponding to the first target system 200-1 may be an enhancement strategy selected by the cyber resilience enhancement system 100 based on a plurality of enhancement strategy candidates for the first target system 200-1 and assessment indicators for each of the enhancement strategy candidates, as output by the artificial intelligence model.

In some other embodiments related to Step S600, the cyber resilience enhancement system 100 may input vulnerability data of the first target system 200-1 and context data related to the first target system 200-1 into the artificial intelligence model, and determine an enhancement strategy corresponding to the first target system 200-1 based on the output of the artificial intelligence model.

In some other embodiments related to Step S600, the context data may include one or more of an identifier of the resilience assessment data of the first target system 200-1, a date on which the resilience assessment is performed for the first target system 200-1, an assessment version of the resilience assessment data of the first target system 200-1, a performer of the resilience assessment for the first target system 200-1, and information on the resilience assessment method of the first target system 200-1.

Figure 6:
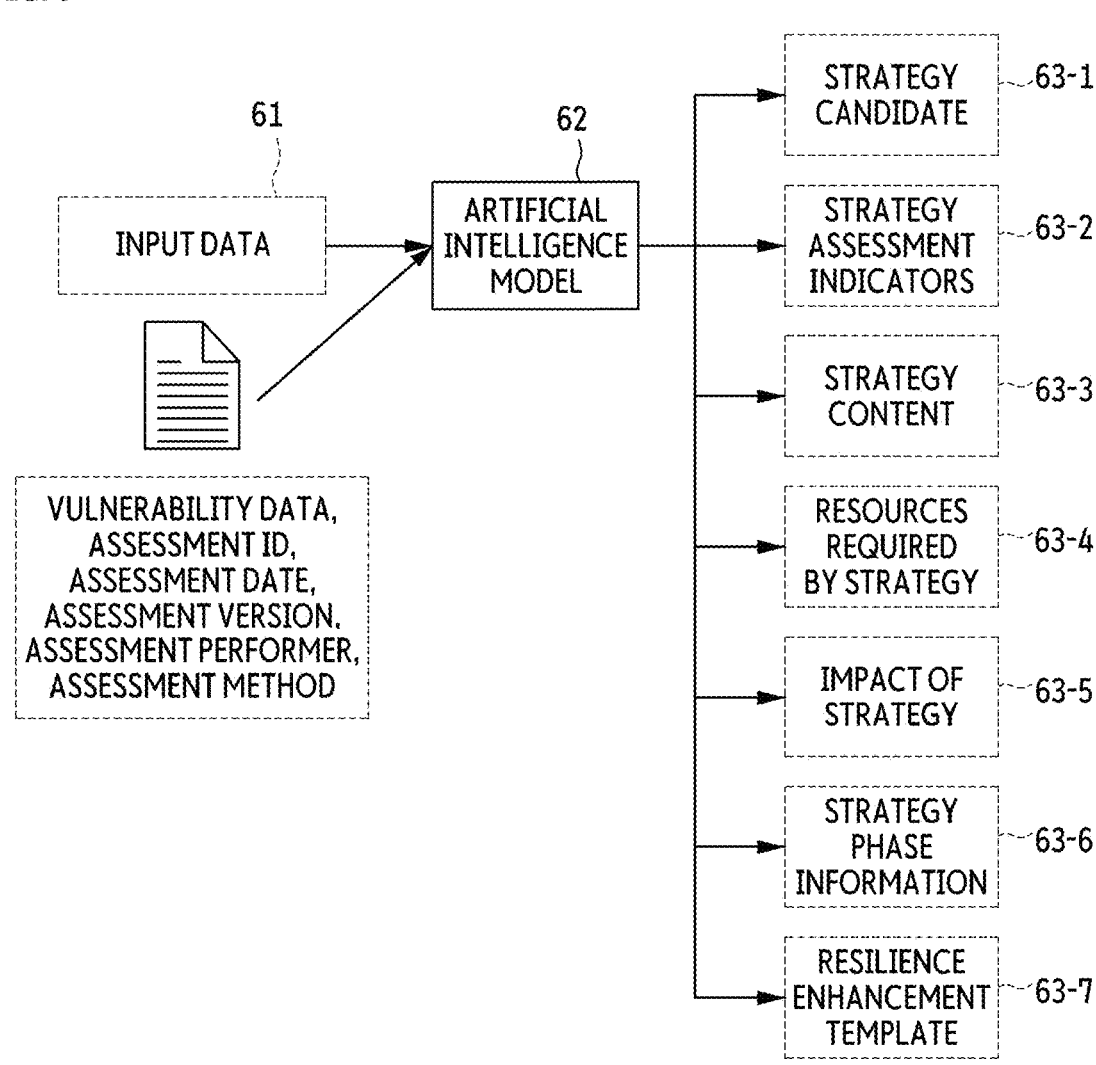
FIG. 6 shows a diagram illustrating an artificial intelligence model according to some embodiments of the present disclosure.

For example, referring to FIG. 6, the artificial intelligence model 62 may go through supervised, semi-supervised, or unsupervised learning based on a plurality of training data (input data 61). For example, a training data set including a plurality of positive prompts, a plurality of negative prompts, and a plurality of ground truth data may be applied to an artificial intelligence model 62, and the artificial intelligence model 62 may go through supervised learning so that the strategy candidates, enhancement strategy assessment indicators for each strategy candidate, strategy contents, information on resource requirement for each strategy candidate, impact information for each strategy candidate, strategy phase information, and resilience enhancement templates 63-1, 63-2, 63-3, 63-4, 63-5, 63-6, and 63-7 output from the artificial intelligence model 62 based on the positive prompts/negative prompts become similar/identical to the strategy candidates, enhancement strategy assessment indicators for each strategy candidate, strategy contents, information on resource requirement for each strategy candidate, impact information for each strategy candidate, strategy phase information, and resilience enhancement templates 63-1, 63-2, 63-3, 63-4, 63-5, 63-6, and 63-7 included in the ground truth data. When the training of the artificial intelligence model 62 is repeated, the weights of each node included in the artificial intelligence model 62 may converge to optimal values.

In some embodiments of the present disclosure, the strategy phase information may include detailed strategy phase information included in each enhancement strategy candidate and priority information for each strategy phase.

In some other embodiments related to Step S600, FIG. 7 may be understood as a data schema of a specific enhancement strategy, illustrated to facilitate understanding of an enhancement strategy according to some embodiments of the present disclosure.

For example, referring to FIG. 7, an enhancement strategy may include one or more of a unique identifier of the enhancement strategy, vulnerability information related to the enhancement strategy, a name of the enhancement strategy, purpose information of the enhancement strategy, priority information of the enhancement strategy, multiple strategy phases included in the enhancement strategy, dependency information of the enhancement strategy, and a reliability score of the enhancement strategy.

In some other embodiments related to step S600, FIG. 8 may be understood as a data schema of a specific resilience enhancement template, illustrated to facilitate understanding of a resilience enhancement template according to some embodiments of the present disclosure.

For example, referring to FIG. 8, the resilience enhancement template may include one or more of a unique identifier of the resilience enhancement template, an identifier of an enhancement strategy related to the resilience enhancement template, a name of the resilience enhancement template, type information of the resilience enhancement template, application target platform information of the resilience enhancement template, a format of the resilience enhancement template, format information of the resilience enhancement template, a prerequisite of the resilience enhancement template, a verification method after applying the resilience enhancement template, a rollback method of the resilience enhancement template, and impact information of the resilience enhancement template.

In Step S700, the cyber resilience enhancement system 100 may control a security layer of the first target system 200-1 based on the enhancement strategy corresponding to the first target system 200-1 acquired in Step S600.

In some embodiments related to Step S700, the cyber resilience enhancement system 100 may control the security layer of the first target system 200-1 based on the order of each detailed phase included in the generated enhancement strategy.

In some other embodiments related to Step S700, the cyber resilience enhancement system 100 may control the security layer of the first target system 200-1 through a security layer control application programming interface (API) predefined for the first target system 200-1.

For example, when an enhancement strategy includes sub-phases "Policy Phase," "Deployment Phase," "Verification Phase," and "Recovery Phase," and the order of the sub-phases defined in the enhancement strategy is "Policy," "Deployment," "Verification," and "Recovery," the cyber resilience enhancement system 100 may deploy security policy code to the first target system 200-1, apply new firewall rules, verify the integrity of the new policy, and perform a backup.

For another example, based on the enhancement strategy, the cyber resilience enhancement system 100 may identify the administrator account of the first target system 200-1 in a first sub-phase, generate a multi-step authentication policy, and perform a simulation. In a second sub-phase, the policy that passed the simulation may be applied to some of the accounts, and the operational impact may be verified. In a third sub-phase, the verified policy may be applied to all accounts.

So far, methods of enhancing cyber resilience according to different embodiments of the present disclosure have been described with reference to FIGS. 3 to 8. It should be understood that the above-described embodiments are exemplary in all respects and are not limiting.

Figure 9:
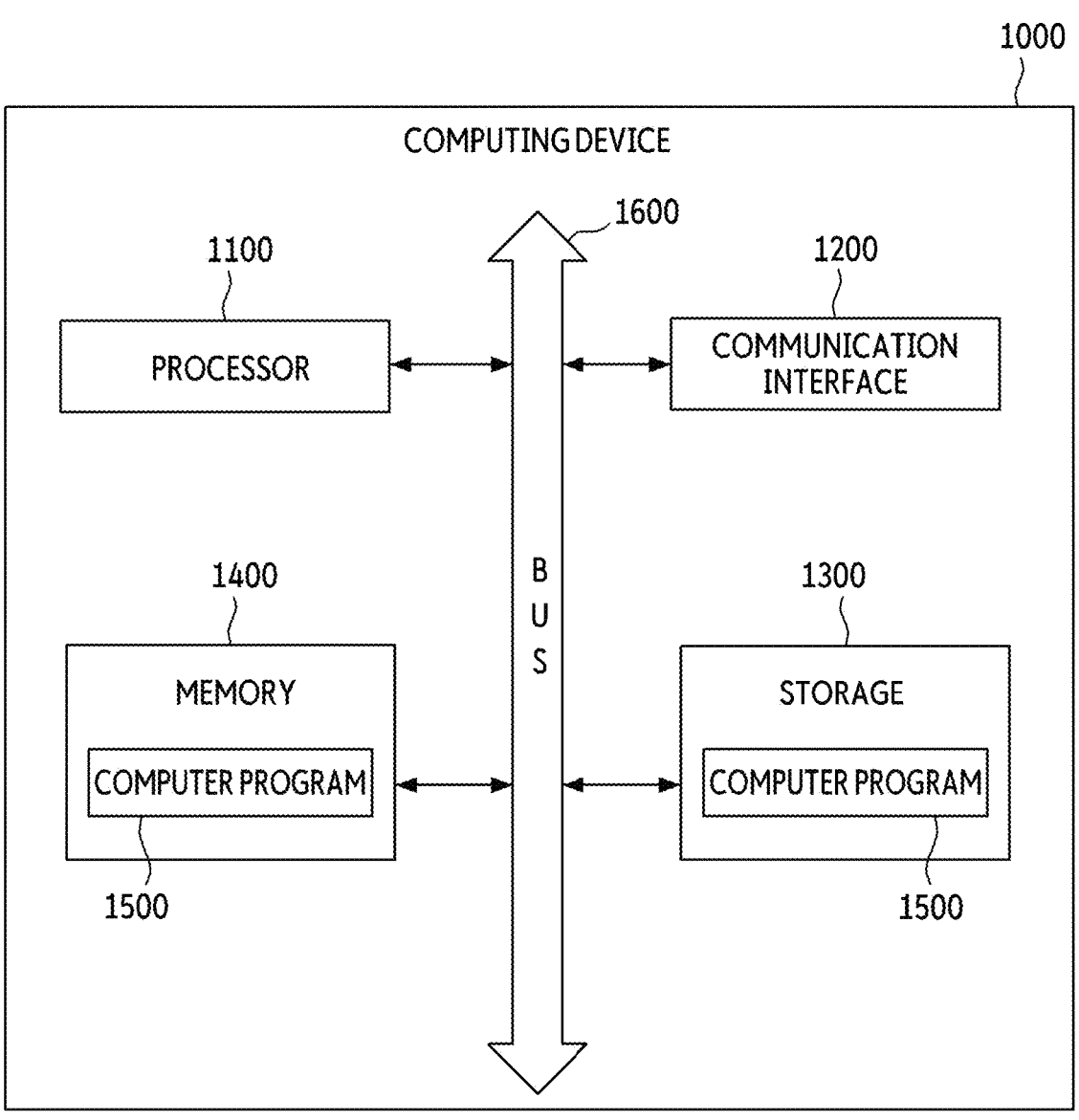
FIG. 9 shows a diagram illustrating a computing system according to another embodiment of the present disclosure.

FIG. 9 is a hardware block diagram of a computing system 1000 according to some embodiments of the present disclosure. The computing system 1000 of FIG. 9 may, for example, refer to the cyber resilience assessment system 100 described with reference to FIG. 1. The computing system 1000 may include one or more processors 1100, a system bus 1600, a communication interface 1200, a memory 1400 that loads a computer program 1500 executed by the processor 1100, and a storage 1300 that stores the computer program 1500.

The processor 1100 controls overall operations of respective configurations of the computing system 1000. The processor 1100 may perform computation for at least one application or program for executing methods/operations according to various embodiments of the present disclosure. The memory 1400 stores various data, commands, and/or information. The memory 1400 may load one or more computer programs 1500 from the storage 1300 in order to execute methods/operations according to various embodiments of the present disclosure. The bus 1600 provides a communication function among components of the computing system 1000. The communication interface 1200 supports Internet communication of the computing system 1000. The storage 1300 may non-transitory store one or more computer programs 1500. The computer program 1500 may include one or more instructions in which methods/operations according to various embodiments of the present disclosure are implemented. When the computer program 1500 is loaded into the memory 1400, the processor 1100 may perform the methods/operations according to various embodiments of the present disclosure by executing the one or more instructions.

In some embodiments, the computing system 1000 described with reference to FIG. 9 may be configured by using one or more physical servers included in a server farm based on cloud technology such as a virtual machine. In this case, at least some of the processor 1100, the memory 1400, and the storage 1300 among the components shown in FIG. 9 may be virtual hardware, and the communication interface 1200 may also be configured as a virtualized networking element such as a virtual switch.

A computer program 1500 according to some embodiments of the present disclosure may include instructions causing the computing system 1000 to perform: a step of acquiring vulnerability data of a target system based on resilience feature data including a quantitative assessment vector and a non-quantitative assessment text of the target system, a step of inputting input data including the vulnerability data into an artificial intelligence model and generating an enhancement strategy for the target system based on output of the artificial intelligence model and a step of controlling a security layer of the target system based on the enhancement strategy.

Thus far, various embodiments of the present disclosure and effects thereof have been mentioned with reference to FIGS. 1 to 9. The effects according to the technical spirit of the present disclosure are not limited to the effects mentioned above, and other effects not mentioned will be clearly understood by those skilled in the art from the description below.

The technical spirit of the present disclosure as described above may be implemented as code readable by a computer on a computer-readable medium. The computer program recorded on the non-transitory computer-readable recording medium may be transmitted to another computing device through a network such as the Internet and installed in the other computing device, and thus may be used in the other computing device.

Although operations are illustrated in the drawings in a specific order, it should not be understood that the operations must be performed in the specific order illustrated or in a sequential order, or that all the illustrated operations must be performed to obtain desired results. In particular situations, multitasking and parallel processing may be advantageous. Although embodiments of the present disclosure have been described with reference to the accompanying drawings, those skilled in the art to which the present disclosure pertains will understand that the present invention may be embodied in other specific forms without changing the technical spirit or essential characteristics. Therefore, the embodiments described above are to be understood as illustrative in all respects and not limiting. The scope of protection of the present invention should be interpreted by the claims below, and all technical ideas within equivalent scope should be interpreted as being included within the scope of rights defined by the present disclosure.

What is claimed is:

1. A method of enhancing cyber resilience performed by a computing system, comprising:
   a step of acquiring resilience assessment data of a target system, the resilience assessment data including non-quantitative assessment data of the target system;
   a step of converting quantitative data included in the resilience assessment data into a quantitative assessment vector;
   a step of refining the non-quantitative assessment data included in the resilience assessment data to generate non-quantitative assessment text;
   a step of generating evidence-item data by mapping each assessment item and each pieces of assessment evidence included in the resilience assessment data;
   a step of generating asset linkage information by mapping each asset of the target system and each detailed data of the resilience assessment data based on the evidence-item data;
   a step of acquiring vulnerability data of a target system based on resilience feature data including the quantitative assessment vector and the non-quantitative assessment text of the target system;
   a step of inputting input data including the vulnerability data into an artificial intelligence model and generating an enhancement strategy for the target system based on output of the artificial intelligence model; and
   a step of controlling a security layer of the target system based on the enhancement strategy.

2. The method of claim 1, wherein the step of acquiring vulnerability data of the target system includes a step of acquiring a cache enhancement scheme corresponding to the vulnerability data, and the cache enhancement scheme is a list of security configuration change items for addressing vulnerabilities in the target system without causing service interruption.

3. The method of claim 1, wherein the vulnerability data includes at least one of vulnerability information of the target system, a risk score due to the vulnerability, information on impact scope of the vulnerability, and information on evidence for deriving the vulnerability.

4. The method of claim 3, wherein the enhancement strategy includes a resilience enhancement template, and the resilience enhancement template is a resilience enhancement template corresponding to a vulnerability of the target system among a plurality of predefined resilience enhancement templates.

5. The method of claim 4, wherein the enhancement strategy further includes at least one of a plurality of enhancement strategy candidates, an impact of the enhancement strategy, an assessment indicator for each of the enhancement strategy candidates, and an enhancement strategy priority.

6. The method of claim 5, wherein the step of generating an enhancement strategy for the target system includes a step of selecting a specific enhancement strategy based on an assessment indicator for each of the enhancement strategy candidates.

7. The method of claim 1, wherein the enhancement strategy includes a plurality of strategy phases whose order is predefined, and the step of controlling the security layer of the target system based on the enhancement strategy includes a step of controlling the security layer of the target system based on the order of the strategy phases.

8. The method of claim 1, wherein the input data includes the vulnerability data and context data, and the context data includes at least one of version of the resilience assessment data, assessment performer, and assessment item information.

9. A non-transitory computer-readable recording medium storing instructions, the instructions configured to perform:
  a step of acquiring resilience assessment data of a target system, the resilience assessment data including non-quantitative assessment data of the target system;
  a step of converting quantitative data included in the resilience assessment data into a quantitative assessment vector;
  a step of refining the non-quantitative assessment data included in the resilience assessment data to generate non-quantitative assessment text;
  a step of generating evidence-item data by mapping each assessment item and each pieces of assessment evidence included in the resilience assessment data;
  a step of generating asset linkage information by mapping each asset of the target system and each detailed data of the resilience assessment data based on the evidence-item data;
  a step of acquiring vulnerability data of a target system based on resilience feature data including a quantitative assessment vector and a non-quantitative assessment text of the target system;
  a step of inputting input data including the vulnerability data into an artificial intelligence model and generating an enhancement strategy for the target system based on output of the artificial intelligence model; and
  a step of controlling a security layer of the target system based on the enhancement strategy.

10. A cyber resilience enhancement system comprising:
  one or more processors; and
  a memory storing a computer program executed by the one or more processors, the computer program including instructions that cause the processor to perform:
  a step of acquiring resilience assessment data of a target system, the resilience assessment data including non-quantitative assessment data of the target system;

a step of converting quantitative data included in the resilience assessment data into a quantitative assessment vector;
  a step of refining the non-quantitative assessment data included in the resilience assessment data to generate non-quantitative assessment text;
  a step of generating evidence-item data by mapping each assessment item and each pieces of assessment evidence included in the resilience assessment data;
  a step of generating asset linkage information by mapping each asset of the target system and each detailed data of the resilience assessment data based on the evidence-item data;
  a step of acquiring vulnerability data of a target system based on resilience feature data including a quantitative assessment vector and a non-quantitative assessment text of the target system;
  a step of inputting input data including the vulnerability data into an artificial intelligence model and generating an enhancement strategy for the target system based on output of the artificial intelligence model; and
  a step of controlling a security layer of the target system based on the enhancement strategy.

11. The system of claim 10, wherein the step of acquiring vulnerability data of the target system includes a step of acquiring a cache enhancement scheme corresponding to the vulnerability data, and the cache enhancement scheme is a list of security configuration change items for addressing vulnerabilities in the target system without causing service interruption.

12. The system of claim 10, wherein the vulnerability data includes at least one of vulnerability information of the target system, a risk score due to the vulnerability, information on impact scope of the vulnerability, and information on evidence for deriving the vulnerability.

13. The system of claim 12, wherein the enhancement strategy includes a resilience enhancement template, and the resilience enhancement template is a resilience enhancement template corresponding to a vulnerability of the target system among a plurality of predefined resilience enhancement templates.

14. The system of claim 13, wherein the enhancement strategy further includes at least one of a plurality of enhancement strategy candidates, an impact of the enhancement strategy, an assessment indicator for each of the enhancement strategy candidates, and an enhancement strategy priority.

15. The system of claim 14, wherein the step of generating an enhancement strategy for the target system includes a step of selecting a specific enhancement strategy based on an assessment indicator for each of the enhancement strategy candidates.

16. The system of claim 10, wherein the enhancement strategy includes a plurality of strategy phases whose order is predefined, and the step of controlling the security layer of the target system based on the enhancement strategy includes a step of controlling the security layer of the target system based on the order of the strategy phases.

17. The system of claim 10, wherein the input data includes the vulnerability data and context data, and the context data includes at least one of version of the resilience assessment data, assessment performer, and assessment item information.

* * * * *